(12) United States Patent
Zhuang et al.

(10) Patent No.: US 10,524,035 B2
(45) Date of Patent: ***Dec. 31, 2019

(54) AUDIO LIGHTING DEVICE

(71) Applicant: XIAMEN ECO LIGHTING CO. LTD., Xiamen (CN)

(72) Inventors: Jiaqing Zhuang, Xiamen (CN); Zhenqi Yan, Xiamen (CN); Maojin Zeng, Xiamen (CN); Runfu Zhang, Xiamen (CN)

(73) Assignee: XIAMEN ECO LIGHTING CO. LTD., Xiamen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/868,329

(22) Filed: Jan. 11, 2018

(65) Prior Publication Data

US 2018/0249234 A1 Aug. 30, 2018

(30) Foreign Application Priority Data

Feb. 27, 2017 (CN) .......................... 2017 1 0107480
Oct. 20, 2017 (CN) .......................... 2017 1 0981837

(51) Int. Cl.
*F21V 14/00* (2018.01)
*H04R 1/02* (2006.01)
(Continued)

(52) U.S. Cl.
CPC ............. *H04R 1/028* (2013.01); *F21V 29/70* (2015.01); *F21V 33/0056* (2013.01); *G06F 3/0488* (2013.01); *G06F 3/165* (2013.01); *G10K 11/17823* (2018.01); *H04R 1/2857* (2013.01); *H05B 37/029* (2013.01); *H05B 37/0227* (2013.01); *H05B 37/0272* (2013.01);
*F21S 8/02* (2013.01); *F21V 3/00* (2013.01); *F21V 7/00* (2013.01); *F21V 7/0066* (2013.01); *F21V 13/02* (2013.01); *F21V 23/0435* (2013.01); *F21Y 2115/10* (2016.08); *G10K 11/178* (2013.01); *G10K 2210/105* (2013.01);
(Continued)

(58) Field of Classification Search
CPC ...... F21V 14/00; F21V 33/0056; F21V 29/70; H05B 37/029; H04R 1/028; H04R 1/026
USPC .................................. 381/71, 334, 172, 71.1
See application file for complete search history.

(56) References Cited

U.S. PATENT DOCUMENTS

2016/0057521 A1* 2/2016 Sun .......................... H04R 1/028
  381/334
2017/0195762 A1* 7/2017 Lin .......................... H04R 1/026
2018/0049298 A1* 2/2018 Benoit ..................... F21V 14/00

* cited by examiner

*Primary Examiner* — Paul Kim
*Assistant Examiner* — Ubachukwu A Odunukwe
(74) *Attorney, Agent, or Firm* — Chun-Ming Shih; LanyWay IPR Services (57) ABSTRACT

Disclosed herein is an audio lighting device, which includes a wireless module, an audio source control circuit, a light source control circuit, a speaker, and a light source board. The wireless module receives a wireless signal and outputs an audio source control signal. The audio source control circuit receives the audio source control signal and outputs a first analog signal. The light source control circuit receives the audio source control signal and outputs a second analog signal. The speaker receives the first analog signal and outputs audio signal. The light source board receives the second analog signal to control the brightness of the outputted light, in which the brightness of the outputted light is proportional to the volume of the outputted audio signal.

11 Claims, 4 Drawing Sheets

(51) Int. Cl.
    *F21V 33/00*           (2006.01)
    *H05B 37/02*           (2006.01)
    *F21V 29/70*           (2015.01)
    *G06F 3/16*            (2006.01)
    *H04R 1/28*            (2006.01)
    *G10K 11/178*          (2006.01)
    *G06F 3/0488*          (2013.01)
    *H04R 3/00*            (2006.01)
    *F21V 7/00*            (2006.01)
    *F21V 3/00*            (2015.01)
    *F21S 8/02*            (2006.01)
    *F21V 13/02*           (2006.01)
    *F21V 23/04*           (2006.01)
    *F21Y 115/10*          (2016.01)
    *H04R 1/24*            (2006.01)
(52) U.S. Cl.
    CPC .................. *G10K 2210/108* (2013.01); *G10K 2210/3044* (2013.01); *H04R 1/24* (2013.01); *H04R 3/00* (2013.01); *H04R 2201/028* (2013.01); *H04R 2420/07* (2013.01)

AUDIO LIGHTING DEVICE

FIELD OF INVENTION

The present disclosure relates to an audio lighting device; more particularly, to an audio lighting device in which the audio signal and lighting complement with each other to improve the overall performance of the audio lighting device.

DESCRIPTION OF RELATED ART

Lighting devices are indispensable in the household or workplace. With the improvement of people's living standard, more and more people may listen to the music at home, and accordingly, the need for installing the audio system at home also increases. Moreover, in response to the need of holding meetings, the workplace should have the loudspeaker, and hence the need for installing the audio system also exists in the workplace.

Currently, the lighting devices and the audio devices are often separate devices, and hence, they should be purchased and installed separately. Furthermore, because the devices should be installed at different places, it may jeopardize the interior design and result in an aesthetically nonappealing appearance.

Moreover, although there are some lighting devices with an audio device on the market, yet they have their own disadvantages. For example, some may sacrifice the space for the audio device in order to maintain the appearance of the lighting device, thereby resulting in the audio distortion and causing discomfort to the hearing. Otherwise, some may sacrifice the original design of the appearance of the lighting device in order to improve the performance of the audio device, thereby jeopardizing the aesthetically appealing appearance. In view of the foregoing, it is a challenging development field to provide an audio lighting device that has the advantages of both the aesthetically appealing appearance and reduced audio distortion. Moreover, there is no mutual complement between the audio signal and lighting, hence the audio lighting device do not bring into the full utility. It is a challenging research field to complement the audio signal and lighting of the audio lighting device.

SUMMARY

In light of the foregoing technical problems, the present inventor proposes the following aspects to respectively address some or all of the technical problems.

According to some aspects of the present disclosure, an audio/lighting system is provided; said audio/lighting system is configured to complement two or more audio lighting devices with one another to respectively provide audio signal of different frequencies thereby providing an accord. This audio/lighting system may also control the outputted light so that it matches the rhythm of the music to create a desired atmosphere. The components of said audio/lighting system are described below. The audio/lighting system comprises a first audio lighting device and a second audio lighting device. The first audio lighting device comprises a first light source board, a first speaker, and a first driving circuit board. The first driving circuit board is disposed with a first wireless module and a first audio source control circuit. The first wireless module is configured to receive a wireless control signal to generate a first audio source control signal. The first audio source control signal is configured to control the first speaker to output audio signal of a first set of frequency. The second audio lighting device comprises a second light source board, a second speaker, and a second driving circuit board. The second driving circuit board is disposed with a second wireless module and a second audio source control circuit. The second wireless module is configured to receive the wireless control signal to generate a second audio source control signal. The second audio source control signal is configured to control the second speaker to output audio signal of a second set of frequency. The audio signal of the first set of frequency is different from the audio signal of the second set of frequency.

In some embodiments, the audio/lighting system further comprises a control device. The control device is disposed with a third wireless module, wherein the third wireless module is configured to output the wireless control signal.

In some other embodiments, the control device is disposed with a touch screen, wherein the touch screen is configured to allow the user to adjust the light and audio signal of the audio/lighting system.

In some other embodiments, the first audio lighting device further comprises a heat dissipation device, an audio guiding device, and a casing. The center of the heat dissipation device has a bump structure raised upward. The audio guiding device has a top surface, a lateral surface, and a bottom surface, wherein the bottom surface of the audio guiding device and the top surface of the audio guiding device form an audio guiding channel. The casing is located above the audio guiding device, and the inner surface of the casing and the top surface of the audio guiding device form a sound box.

In some other embodiments, the first audio lighting device comprises a plurality of audio outlets, which is located outside the periphery of the bump structure and below the audio guiding channel.

In some other embodiments, the audio lighting device further comprises a reflector and diffusion plate. The reflector is fixed below the periphery of the light source board. The diffusion plate is located below the light source board.

According to another aspect of the present disclosure, an audio lighting device is further provided. The components of said audio lighting device are described below. The audio lighting device comprises a wireless module, an audio source control circuit, a light source control circuit, a speaker, and a light source board. The wireless module is configured to receive a wireless signal and output an audio source control signal. The audio source control circuit is configured to receive the audio source control signal and output a first analog signal. The light source control circuit is configured to receive the audio source control signal and output a second analog signal. The speaker is configured to receive the first analog signal and output audio signal. The light source board is configured to receive the second analog signal to control the brightness of the outputted light. The brightness of the outputted light is proportional to the volume of the outputted sound.

In some embodiments, the audio lighting device further comprises a heat dissipation device, an audio guiding device, and a casing. The center of the heat dissipation device has a bump structure raised upward. The audio guiding device has a top surface, a lateral surface, and a bottom surface. The bottom surface of the audio guiding device and the top surface of the audio guiding device form an audio guiding channel. The casing is located above the audio guiding device. The inner surface of the casing and the top surface of the audio guiding device form a sound box.

In some other embodiments, the audio lighting device comprises a plurality of audio outlets located outside the periphery of the bump structure and below the audio guiding channel.

In some other embodiments, the audio lighting device further comprises a reflector and a diffusion plate. The reflector is fixed below the periphery of the light source board. The diffusion plate is located below the light source board.

According to another aspect of the present disclosure, an audio lighting device is further provided. The components of said audio lighting device are described below. The audio lighting device comprises a wireless module, a light source control circuit, an audio source control circuit, a speaker, a recording terminal, an audio signal processing module, and a light source board. The wireless module is configured to receive a wireless signal and output an audio source control signal and a light source control signal. The light source control circuit is configured to receive the light source control signal and output a light source driving current. The audio source control circuit is configured to receive the audio source control signal and output an audio source driving signal. The speaker is configured to output audio according to the audio source driving signal. The recording terminal is configured to receive an environmental audio signal when the speaker does not output audio signal. The audio signal processing module is configured to generate a reverse audio according to the environmental audio signal, wherein the reverse audio automatically reduces noise when the recording terminal records sound. The light source board is configured to receive the light source driving current to output light.

In some embodiments, the audio lighting device further comprises a heat dissipation device, an audio guiding device, and a casing. The center of the heat dissipation device has a bump structure raised upward. The audio guiding device has a top surface, a lateral surface, and a bottom surface. The bottom surface of the audio guiding device and the top surface of the audio guiding device form an audio guiding channel. The casing is located above the audio guiding device. The inner surface of the casing and the top surface of the audio guiding device form a sound box.

In some other embodiments, the audio lighting device comprising a plurality of audio outlets located outside of the periphery of the bump structure and below the audio guiding channel.

In some other embodiments, the audio lighting device further comprises a reflector and diffusion plate. The reflector is fixed below the periphery of the light source board. The diffusion plate is located below the light source board.

By using the embodiments described above, it is possible to address one or more above-mentioned technical problems in view of the different technical features of the embodiments.

As could be appreciated, this section presents a simplified summary of the disclosure in order to provide a basic understanding to the reader. This summary is not an extensive overview of the disclosure and it does not identify key/critical elements of the present invention or delineate the scope of the present invention.

BRIEF DESCRIPTION OF THE DRAWINGS

The present description will be better understood from the following detailed description read in light of the accompanying drawings as set forth below.

In accordance with common practice, the various described features/elements are not drawn to scale but instead are drawn to best illustrate specific features/elements relevant to the present invention. Also, like reference numerals and designations in the various drawings are used to indicate like elements/parts.

DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

According to one embodiment of the present disclosure, an audio lighting device is provided, in which the audio lighting device not only retains the original appearance design of a lighting device but also effectively reduces the audio distortion.

Figure 1:
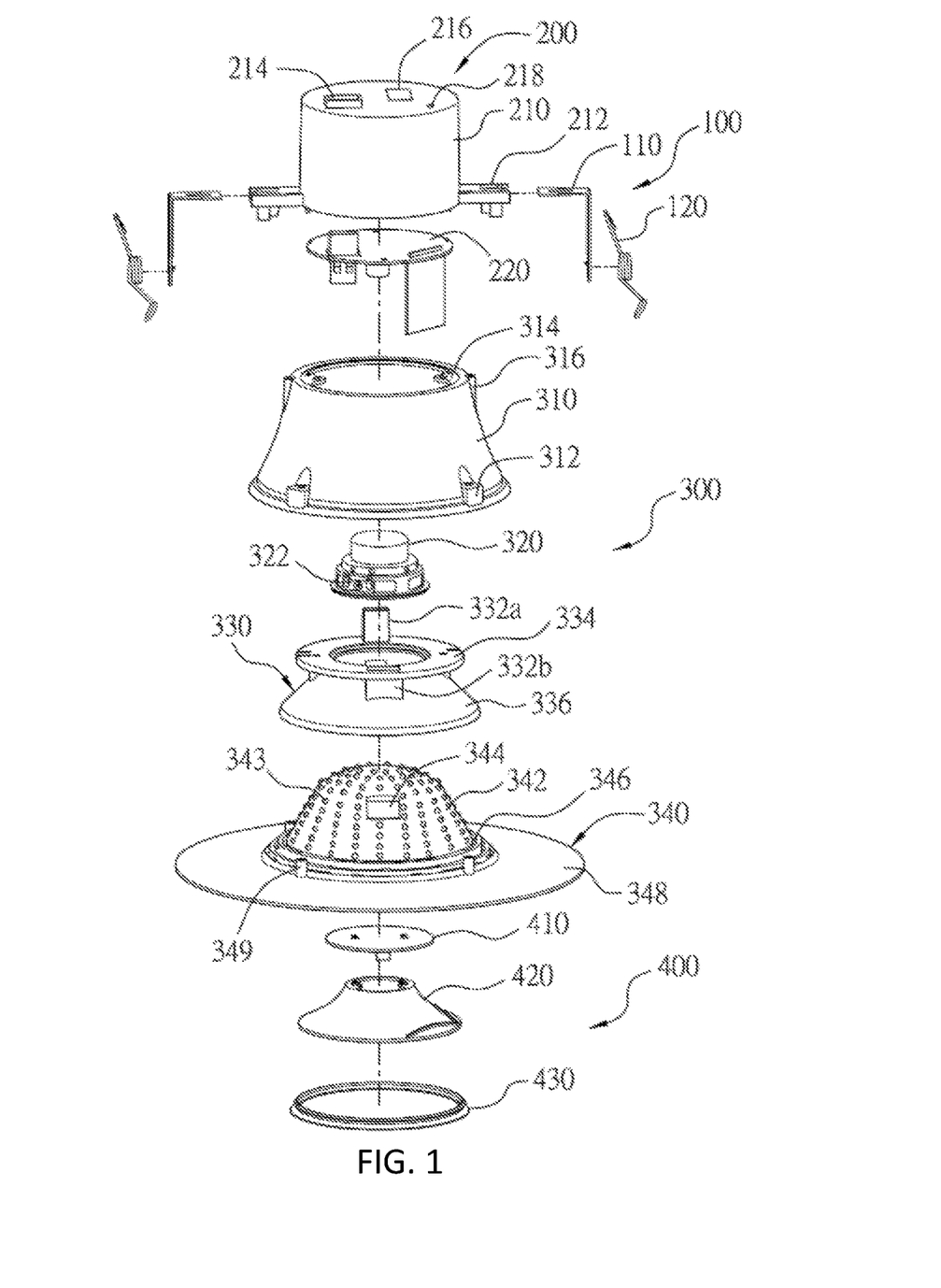
FIG. 1 is a schematic diagram illustrating the overall exploded view of an audio lighting device according to one embodiment of the present disclosure.

Referring to FIG. 1, which is a schematic diagram illustrating the overall exploded view of an audio lighting device according to one embodiment of the present disclosure. In FIG. 1, the audio lighting device comprises sequentially, from top to bottom, a fixation part 100, a control part 200, an audio part 300, and a light source part 400.

The fixation part 100 is configured to facilitate the fixation of the audio lighting device in a predetermined installation environment, and hence, the fixation part 100 may be any available fixation assembly. For example, in FIG. 1, the fixation part 100 consists of a bracket 110 and a spring 120.

The control part 200 comprises, basically, a casing 210 and a circuit board 220. The bottom of the casing 210 has a bottom end opening, configured to accommodate and cover the circuit board 220, so as to protect the circuit board 220. The casing 210 may further have a first connecting member 212 and a power socket 214 disposed thereon. The first connecting member 212 is configured to be connected with the fixation part 100, thereby facilitating the installation of the audio lighting device. The power socket 214 is configured to form an electrical connection with an external power source, and also form an electrical connection with the circuit board 220, thereby supplying the electricity required for the operation of the circuit board 220.

Figure 2:
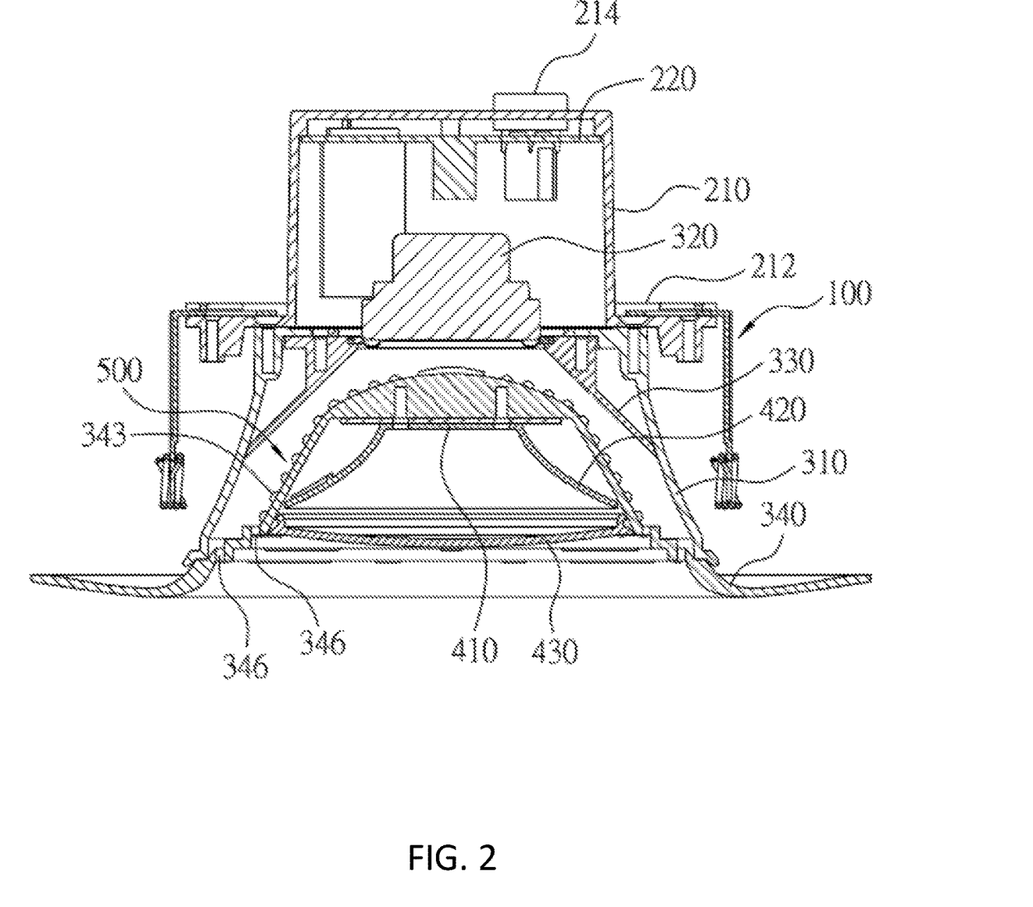
FIG. 2 is a schematic diagram illustrating the cross-sectional view of the combined structure of an audio lighting device according to one embodiment of the present disclosure.
Figure 3:
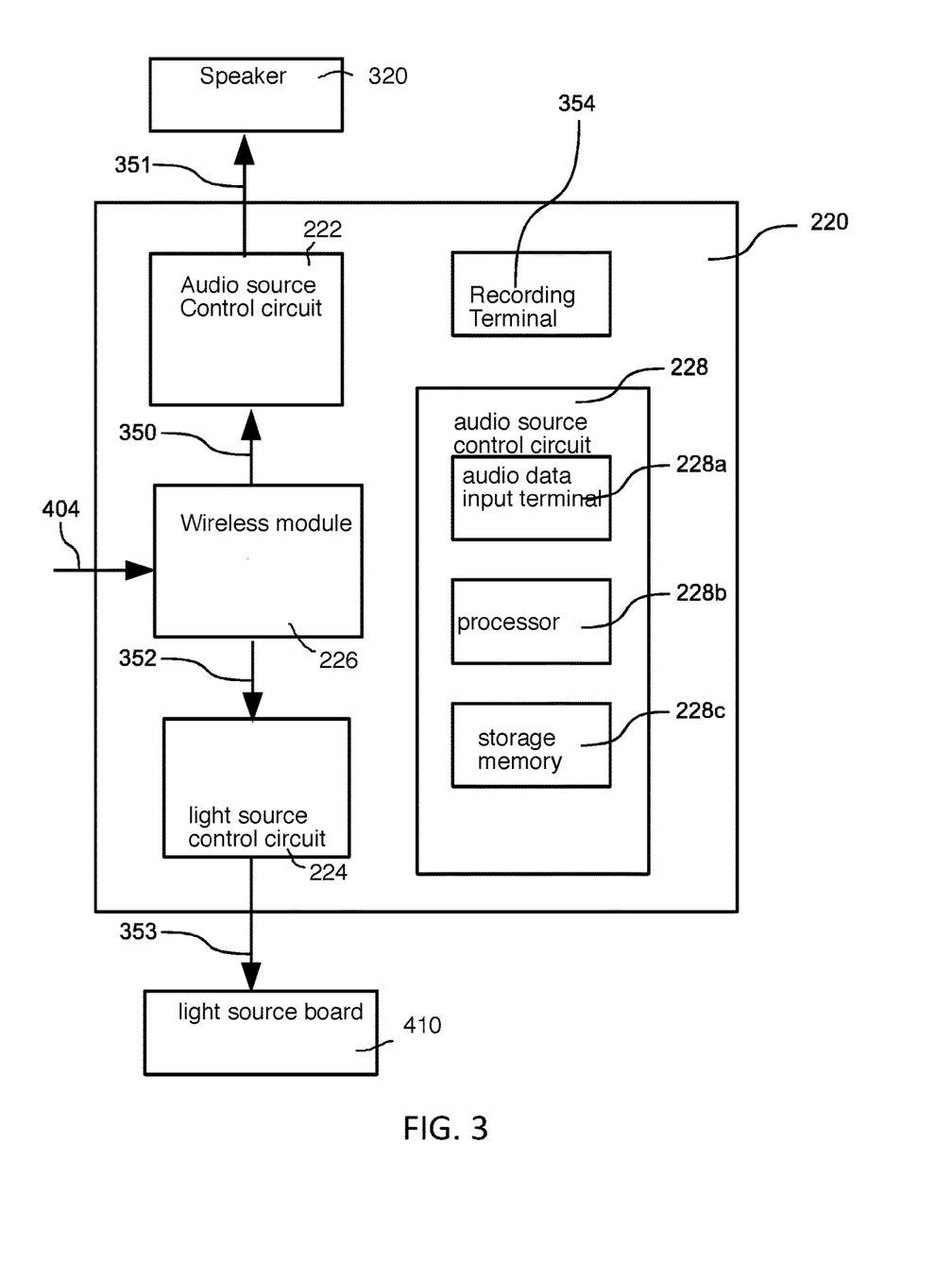
FIG. 3 is a schematic diagram illustrating the internal functional blocks of the circuit board 220 of an audio lighting device according to one embodiment of the present disclosure.

Referring to FIG. 3 at the same time. The circuit board 220 is located in the space within the casing 210, and the printed circuit board thereof has an audio source control circuit 222 and a light source control circuit 224 fixed thereon. The audio source control circuit 222 may control the operation of the speaker 320 of the audio part 300, such as the output and volume of the sound; the light source control circuit 224 may control the brightness of the light emitted by the light source board 410 of the light source part 400. Since the circuit board 220 is fixed at a position below the top plate of the casing 210 (also referring to FIG. 2), the surface of the circuit board 220 that is relatively flat faces upward to facilitate the fixation of the circuit board 220.

In some embodiments, the circuit board 220 further comprises a wireless module 226 thereon. The wireless communication system of the wireless module 226 may be, for example, a blue tooth system or a wireless fidelity (Wi-Fi) system. In some embodiments, the wireless module 226 is configured to allow the interconnection of multiple audio lighting devices, thereby forming an audio system with multiple audio tracks. In some other embodiments, the wireless module 226 may further allow the interconnection of the audio lighting device with other device(s), thereby forming an internet of things. In some other embodiments, the wireless module 226 is further configured to allow the audio lighting device to receive the wireless signal from other controller(s), and to output the audio source control signal and light source control signal separately, so as to individually control the operation of the control speaker 320 and the light source board 410 after the audio source control circuit 222 and light source control circuit 224 receive said signals, respectively. The above-mentioned controller may be, for example, a common remote control, mobile phone, or other types of available controller.

In some embodiments, the above-mentioned circuit board 220 may further comprise an audio source control circuit 228, which has an audio data input terminal 228a, a processor 228b, and a storage memory 228c. The input terminal 228a is configured to input the audio data from an external source; for example, it may be a universal serial bus (USB) for directly inputting the audio data stored in a USB drive, and the casing 210 has a corresponding audio jack 216. Alternatively, the input terminal 228a may be a microphone configured to record the audio signal from the exterior environment, and the casing 210 has a corresponding recording hole 218. The processor 228b is configured to decode the compressed audio data inputted from the USB or the compress the audio data inputted from the microphone. The storage memory 228c is configured to store the audio data inputted from the input terminal 228a, or to store the audio data processed by the processor 228b. The audio data stored in the storage memory 228c is configured to be played by the speaker 320 of the audio part 300.

The environmental sounds recorded by the microphone may have applications described below. For example, it may comprise an audio wave that can be used to generate a reverse audio wave, which may be used together with the environmental sound to form a destructive interference, thereby reducing the noise. Alternatively, it can be used to adjust an audio system with multiple audio tracks formed by a plurality of audio lighting device, to generate an audio signal filed suitable for playing various types of music. Moreover, it could be used as a monitor system for the environment, such as being integrated with the home security system or home care system, so that once an abnormal sound is detected, the system may notify the home security company or the healthcare unit to act accordingly.

The audio part 300 comprises, basically, components such as an outer cover 310, a speaker 320, an audio guiding device 330, and a heat dissipation device 340. The outer cover 310 has a top end opening and a bottom end opening. The periphery of the top end opening of the outer cover 310 extends inwardly to form a second connecting member 314, and extends outwardly to form a third connecting member 316. In this way, the upper portion of the second connecting member 314 and third connecting member 316 located on the upper portion of the outer cover 310 abuts with the lower portion of the periphery of the bottom end opening and the first connecting member 212 of the casing 210, in which the two are fixated with each other (also referring to FIG. 2) using any available fixation connecting member (not shown in the drawings). For example, the fixation connecting member may be a screw/screw hole, bolt/bolt hole, etc. Moreover, in some embodiments, a first sealing member (not shown in the drawings) may be further incorporated between the outer cover 310 and the casing 210; for example, the first sealing member may be an O-shaped sealing ring or pad, so that there is no gap between the outer cover 310 and the casing 210, thereby forming a seal condition. Additionally, the periphery of the bottom of the outer cover 310 has a plurality of first fixing members 312, which are configured to fix the heat dissipation device 340 and the outer cover 310 with each other.

The speaker 320, in addition to the driver unit, further has an electrical connection terminal 322, configured to form an electrical connection with the audio source control circuit 222 of the circuit board 220.

Together, the top ring sheet 334 at the top and the bottom audio shield 336 at the bottom form the external configuration of the audio guiding device 330. The upper periphery of the top ring sheet 334 and lower portion of the outer cover 310 top end connecting member may be fixed with each other using any available fixation connecting member (not shown in the drawings). For example, the fixation connecting member may be a screw/screw hole, bolt/bolt hole, etc. Moreover, in some embodiments, a second sealing member (not shown in the drawings) may be further incorporated between the outer cover 310 and the casing 210; for example, the second sealing member may be an O-shaped sealing ring or pad, so that there is no gap between the outer cover 310 and the casing 210, thereby forming a seal condition.

The opening at the center of the top ring sheet 334 is configured to accommodate and fix the speaker 320 tightly. Referring to FIG. 2, in this way, the casing 210 and the top ring sheet 334 of the audio guiding device 330 forms the audio box of the speaker 320, and the connecting portions of the two are tightly sealed, so that when the speaker 320 outputs the audio signal, it would not output the noises arising from the mutual impact of the audio wave vibrations.

Additionally, an open-end conduit of the first bass tube 332a is disposed above the top ring sheet 334, while an open-end conduit of the second bass tube 332b is disposed below the top ring sheet 334. Compared with a sealed audio box, the first bass tube 332a and the second bass tube 332b not only allow the audio box to withstand a greater sound pressure, but also output the low-frequency audio signal reflected from the top of the casing 210 (i.e., the circuit board 220) to the exterior of the audio box, thereby enhancing the performance of the low-frequency audio signal and giving a more pleasant low-frequency audio signal. For example, the first bass tube 332a and second bass tube 332b may directly output the low-frequency audio signal to the space below the bottom audio shield 336 (i.e., the audio guiding channel 500 to be discussed below), and propagate it to the exterior via the audio outlet 346.

The center of the heat dissipation device 340 is raised upward to form a bump structure 342 with an arc upper end to facilitate the audio guiding. The lower periphery of the bump structure 342 has a plurality of audio outlets 346, the outer periphery of the audio outlet 346 is the bottom ring sheet 348. Referring to FIG. 2, the bottom ring sheet 348 of the heat dissipation device 340 has a plurality of second fixing members 349, configured to match the first fixing member 312 at the lower periphery of the outer cover 310, so as to allow the mutual fixation between the outer cover 310 and the heat dissipation device 340. For example, the first fixing member 312 and the second fixing member 349 may be a screw and a screw hole, respectively. Moreover, the connection part between the outer cover 310 and the heat dissipation device 340 may further comprise an optional third sealing member, configured to avoid the noise arising from the vibration of audio signals due to the gap between the outer cover 310 and the heat dissipation device 340. The third sealing member may be, for example, an O-shaped sealing ring or pad.

A bass tube opening 344 is disposed on the bump structure 342; the position of the bass tube opening 344 corresponds to the lower opening of the bass tube 332b, and the bass tube opening 344 is configured to output the low-frequency audio signal to the space below the bump structure 342. The audio outlet 346 may be made with any available shape, such as a ring shape or a circular shape, or even a honeycomb shape. Besides, a clamping member (not shown in the drawings) is disposed at the internal surface of the interior of the bottom audio outlet 346 of the bump structure 342.

Referring to FIG. 2 at the same time, there is a distance between the heat dissipation device 340 and the audio guiding device 330 because of the fixation approach. Accordingly, the bottom audio shield 336 at the lower half of the audio guiding device 330, the lower half of the outer cover 310, and the bump structure 342 of the heat dissipation device 340 forms the audio guiding channel 500 for the audio signal, in which the audio signal of the speaker is guided through the audio guiding channel 500 to the audio outlet 346 and finally outputted to the exterior of the audio lighting device. In some embodiments, the wall of the whole audio guiding channel 500 is made of a metal material with a relatively greater thickness to reduce the high-frequency noise arising from the resonance of a thinner wall with the audio signal and also to facilitate the reflection of the audio signal. In some embodiments, the thickness of the metal material may be, for example, 3 mm to 30 mm, and the metal material may be, for example, die cast aluminum or copper. In addition, to reduce the inner loss of the audio energy and to maximize the audio signal to be transmitted to the exterior through the audio guiding channel 500 and the audio outlet 346, the bottom surface of the bottom audio shield 336 of the audio guiding device 330 is smooth, thereby facilitation the propagation of the audio signal.

To provide a bump structure 342 with a better heat dissipation effect, the top surface of the bump structure 342 is a rough surface having a plurality of microstructures 343 to increase the surface area of the bump structure 342, thereby enhancing the heat dissipation effect of the top surface of the bump structure 342. The microstructure 343 may be, for example, a plurality of conical protrusions (such as, triangular pyramid, square pyramid, other polygonal pyramid, or circular cone), arc protrusions or the combination thereof. Moreover, the central top portion of the bump structure 342 is a solid structure (referring to FIG. 2), which may be filled with a material with good heat conductivity, so as to increase the heat dissipation ability of the bump structure 342. In some embodiments, the material with good heat conductivity can be, for example, metal, such as aluminum or copper. Since the light source board 410 of the light source part 400 is fixed to a position below the solid portion of the bump structure 342 of the heat dissipation device 340, the heat conductive material filled in the bump structure 342 may facilitate the uniform distribution of the heat generated by the light source board 410 across the whole bump structure 342, thereby avoiding the problem of local overheat, and enhancing the service life of the light source board 410. As such, there is no need to dispose a heat dissipation fan above the bump structure 342, and consequently, the overall pathway of the audio guiding channel 500 is more unhindered, thereby reducing the energy loss of the audio wave due to the meaningless multiple reflection of the audio wave in the audio guiding channel, so that the audio signal has a better propagation efficacy and propagation quality.

In FIG. 1, the light source part 400 comprises sequentially, from top to bottom, a light source board 410, a reflector 420, and a diffusion plate 430. The light source board 410 is fixed below the bump structure 342 of the heat dissipation device 340 (referring to FIG. 2), wherein the light source board 410 is configured to fix one or more light sources, such as light emitting diodes (LEDs). The reflector 420 is fixed on the light source board 410, and is configured to reflect the light emitted from the light source on the light source board 410. The diffusion plate 430 is fixed on the clamping member at the inner surface of the interior of the bottom audio outlet 346 of the bump structure 342 of the heat dissipation device 340, and is configured such that in does not block the audio outlet 346. With the diffusion plate 430, the light source may emit a light that is more uniform and less dazzling.

Referring to FIG. 2, which is a schematic diagram illustrating the cross-sectional view of the combined structure of an audio lighting device according to one embodiment of the present disclosure. In FIG. 2, the fixation part 100 is fixed on the first connecting member 212 of the casing 210. A power socket 214 is disposed on the top of the casing 210. The circuit board 220, on the other hand, is fixed below the top plate of the casing 210 with the IC and circuit assemblies thereof facing downward. Using the outer cover 310 as the fixing bracket, the casing 210 is fixed on the outer cover 310, and the audio guiding device 330 is fixed below the outer cover 310, while the speaker 320 is fixed within the central opening of the audio guiding device 330. In some embodiments, a first sealing member and a second sealing member are respectively incorporate between the casing 210 and the outer cover 310 and between the outer cover 310 and the audio guiding device 330, so that the casing 210 and the top ring sheet 334 of the audio guiding device 330 form a sealed audio box of the speaker 320. Nonetheless, open-end conduits of the first bass tube 332a and the second bass tube 332b are respectively disposed at the upper and lower portions of the top ring sheet 334 of the audio guiding device 330, to enhance the performance of the low-frequency audio signal and increase the level of tolerance to the sound pressure. In this way, it is feasible to address the problem of a completely sealed audio box, in which an amplifier with a great power is required to push the audio box to achieve a desired low-frequency audio performance.

Then, the heat dissipation device 340 is fixed at the periphery of the bottom end of the outer cover 310, so that there is a distance between the heat dissipation device 340 and the audio guiding device 330. In this way, the bottom audio shield 336 at the lower portion of the audio guiding device 330, the lower half of the outer cover 310, and the bump structure 342 of the heat dissipation device 340 form the audio guiding channel 500 for the audio signal. The audio signal from the speaker 320 may pass through said audio guiding channel 500 so that the audio signal is guided to the audio outlet 346 and outputted to the exterior.

Next, the light source board 410 is fixed below the bump structure 342 of the heat dissipation device 340, whereas the reflector 420 is fixed below the light source board 410 and is configured to reflect the light emitted from the light source of the light source board 410. Last, the diffusion plate 430 is fixed on the clamping member disposed at the inner side of the audio outlet 346 of the heat dissipation device 340, so that it does not block the audio outlet 346.

In view of the foregoing, due to the disposition of the first bass tube 332a and the second bass tube 332b on the audio guiding device 330 as well as the disposition of the bass tube opening 344 on the bump structure 342, the audio box formed by the casing 210 and the top ring sheet 334 of the audio guiding device 330 is capable of not only withstanding a greater sound pressure but also improving the performance of the low-frequency audio signal and enhancing the audio quality of the audio outputted by the audio lighting device without increasing the space occupied by the audio part 300.

Additionally, top surface of the bump structure 342 is further disposed with a microstructure 343, and the top end of the bump structure 342 is filled with a heat conductive material, so as to increase the heat dissipation ability of the bump structure 342; therefore, it is not necessary to dispose a heat dissipation fan above the bump structure 342, thereby reducing the space hindrance within the audio guiding channel 500. Accordingly, the audio signal generated by the audio device may have a better propagation efficacy and propagation quality.

Moreover, the circuit board 220 further comprises a wireless module 226 and an audio source control circuit 228, thereby endowing the audio lighting device with more functionality, such as audio signal of multiple audio tracks, denoise, and monitoring.

Accordingly, the audio lighting device that integrate the audio device and lighting device is a better choice for consumers longing for a better audio quality or incapable of enduring poor audio quality when they considering to adopt a single audio lighting device to replace the audio device and lighting device that are originally two separated devices.

Figure 4:
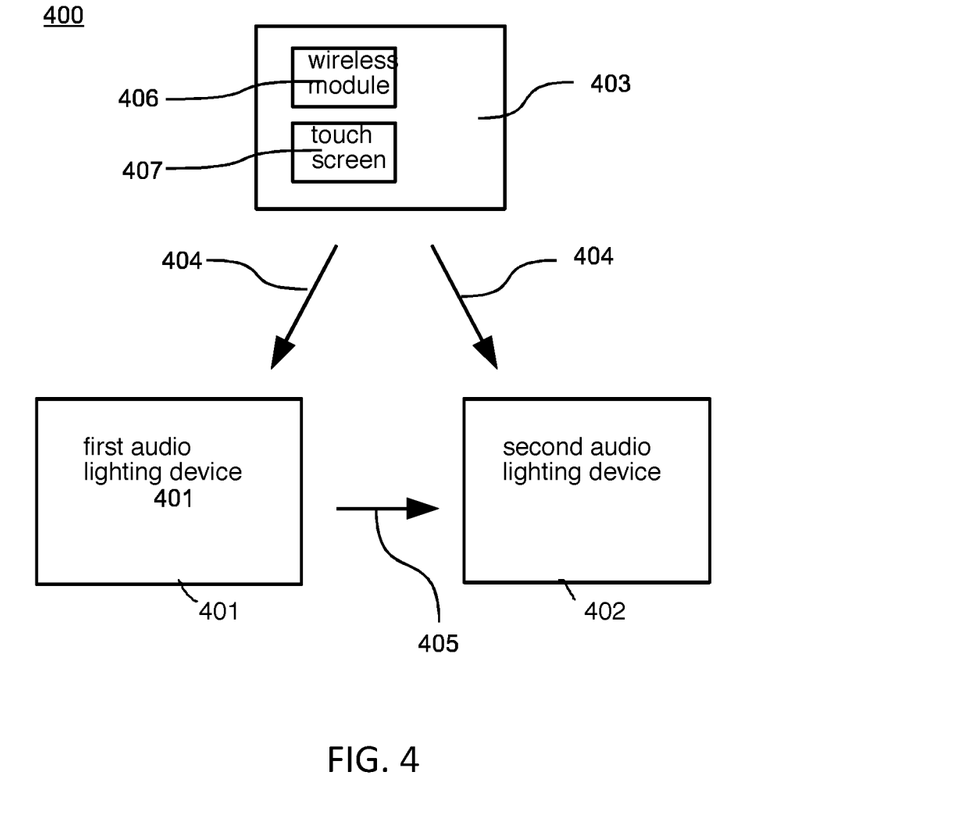
FIG. 4 is a schematic diagram illustrating an audio system according to one embodiment of the present disclosure.

FIG. 4 is a schematic diagram illustrating an audio system according to one embodiment of the present disclosure. Referring to FIG. 3 and FIG. 4, the audio system 400 comprises a first audio lighting device 401 and a second audio lighting device 402. The first audio lighting device 401 and the second audio lighting device 402 are configured to receive the same wireless control signal 404. The first audio lighting device 401 and the second audio lighting device 402 are matched in pair, wherein one of the two is configured to output an audio signal with the lower frequency, while the other is configured to output the audio signal with a higher frequency. In this way, the first audio lighting device 401 and the second audio lighting device 402 may provide an accord, so that the user may have a better audio experience. In another embodiment, the first audio lighting device 401 and the second audio lighting device 402 are disposed at different space and facing different directions; in this way, it may generate an effect of stereo audio signal. Referring to FIG. 3 and FIG. 4, the first audio lighting device 401 may comprise a light source board 410, a speaker 320, and a driving circuit board 220. The driving circuit board 220 is disposed with a wireless module 226 and an audio source control circuit 222. The wireless module 226 is configured to receive a wireless control signal and generate an audio source control signal; the audio source control signal is configured to control the speaker 320 to output audio signal of a first set of frequency, such as a low-frequency audio signal. The second audio lighting device 402 may have a component configuration that is similar to that of the first audio lighting 401; for example, it may comprise a light source board 410, a speaker 320, and a driving circuit board 220. The second audio lighting device 402 may act in connection with the first audio lighting 401, and is configured to receive the same wireless control signal 404, but output a high-frequency audio signal.

In another embodiment, the first audio lighting device 401 is configured to receive a wireless control signal 404, but the second audio lighting device 402 does not receive the wireless control signal 404. The first audio lighting device 401 is configured to send another wireless control signal 405 to the second audio lighting device 402; the second audio lighting device 402 is configured to output audio signal according to the wireless control signal 405 in connection with the first audio lighting device 401. The control device 403 comprises a wireless module 406 and a touch screen 407; the control device 403 is configured to send a wireless control signal 404 through the wireless module 406. The used may use the touch screen 407 to adjust the brightness of the light and the volume of the audio signal of the audio/lighting system 400. The wireless control signal 404 may comprise, in addition to the information for controlling the audio signal, the information for controlling the lighting. In other words, the content of the information of the wireless control signal 404 may control the audio signal and lighting at the same time. The control device 403 is configured to provide various combinations of the audio signal and light. The control device 403 is configured to provide various audio modes, such as the soft mode, jazz music mode, rock music mode, classical music mode, radio mode, etc. It is feasible to choose from various lighting modes that complement with different audio modes; for example, under the soft mode, it may be desirable to select the dimmer pale-yellow light, under the rock music mode, it may be desirable to select a lighting pattern with alternating bright and dark lights corresponding to the rhythm of the music. The first audio lighting device 401 and the second audio lighting device 402 may emit different kinds of light at the same time, such as light of different colors, or light of different rhythms. The term "light of different rhythms," as used herein refers to light that changes with time, in which the modes of alternation of the first audio lighting device 401 and the second audio lighting device 402 are different. The user may select or adjust the changes in the audio signal and light directly using the control device 403.

Referring to FIG. 3, in one embodiment, the wireless module 226 is configured to receive a wireless signal 404 and output an audio source control signal 350. The audio source control circuit 222 is configured to receive the audio source control signal 350 and output a first analog signal 351, in which the analog signal 351 is an audio source driving signal. The light source control circuit 224 is configured to receive the light source control signal 352 and output a second analog signal 353, in which the analog signal 353 is a light source driving current. In some embodiments, the light source control signal 352 and the audio source control signal 350 are the same signal. The speaker 320 is configured to receive the first analog signal 351 and output audio signal. The light source board 410 is configured to receive the second analog signal 353 to control the brightness of the outputted light. In the case where the light source control signal 352 and the audio source control signal 350 are the same signal, the brightness of the outputted light is directly proportional to the volume of the outputted audio signal. In this case, the light changes corresponding to the volume of the audio signal, thereby giving a rhythmic light. In one embodiment, the circuit board 220 comprises a recording terminal 354; the recording terminal 354 is configured to record the audio signal. The recording terminal 354 is also configured to assist in the automatic denoising. For example, when the speaker 320 does not output any audio signal, the recording terminal 354 is configured to receive an environmental audio signal to record the environmental audio signal. The audio signal processing module 228 generates a reverse audio based on the environmental audio signal. The reverse audio is used for automatic denoising when the recording terminal 354 records. The principle underlying the automatic denoising is that during the course of audio processing, the environmental audio signal and the reverse audio signal compensate each other, thereby decreasing or eliminating the environmental sound signal. In this way, the audio signal recorded by the circuit board 220 can be used to eliminate the interference of the environmental sound signal, thereby achieving the automatic denoising.

Although various aspects of the invention have been described above with a certain degree of particularity, or with reference to one or more individual aspects, those with ordinary skill in the art could make numerous alterations to the disclosed aspects, such as the addition or deletion of one or more elements, without departing from the spirit or scope of this invention.

The invention claimed is:

1. An audio lighting system, comprising:
a first audio lighting device, comprising a first light source board, a first speaker, and a first driving circuit board, wherein the first driving circuit board is disposed with a first wireless module and a first audio source control circuit, wherein the first wireless module is configured to receive a wireless control signal to generate a first audio source control signal, and the first audio source control signal is configured to control the first speaker to output audio signal of a first set of frequency; and
a second audio lighting device, comprising a second light source board, a second speaker, and a second driving circuit board, wherein the second driving circuit board is disposed with a second wireless module and a second audio source control circuit, wherein the second wireless module is configured to receive the wireless control signal to generate a second audio source control signal, and the second audio source control signal is configured to control the second speaker to output audio signal of a second set of frequency;
wherein, the first set of frequency is different from the second set of frequency,
wherein the first audio lighting device further comprises,
a heat dissipation device, wherein a center of the heat dissipation device has a bump structure raised upward;
an audio guiding device, having a top surface, a lateral surface, and bottom surface, the bottom surface of the audio guiding device and the top surface of the audio guiding device form an audio guiding channel; and
a casing, located above the audio guiding device, wherein an inner surface of the casing and the top surface of the audio guiding device form an audio box.

2. The audio/lighting system according to the claim 1, further comprising a control device, wherein the control device is disposed with a third wireless module, wherein the third wireless module outputs the wireless control signal.

3. The audio/lighting system according to the claim 1, wherein the control device comprises a touch screen, wherein the touch screen is configured to allow a user to adjust the light and audio signal of the audio/lighting system.

4. The audio/lighting system according to the claim 1, wherein the first audio lighting device further comprises a plurality of audio outlets located outside the periphery of the bump structure and below the audio guiding channel.

5. The audio/lighting system according to the claim 1, further comprising,
a reflector, fixed below the periphery of the light source board; and
a diffusion plate, located below the light source board.

6. An audio lighting device, comprising,
a wireless module, configured to receive a wireless signal and output an audio source control signal;
an audio source control circuit, configured to receive the audio source control signal and output a first analog signal;
a light source control circuit, configured to receive the audio source control signal and output a second analog signal;
a speaker, configured to receive the first analog signal and output audio signal; and
a light source board, configured to receive the second analog signal to control brightness of the outputted light, wherein the brightness of the outputted light is proportional to the volume of the outputted audio signal, wherein the audio lighting device further comprises,
a heat dissipation device, wherein a center of the heat dissipation device has a bump structure raised upward;
an audio guiding device, having a top surface, a lateral surface and a bottom surface, wherein the bottom surface of the audio guiding device and the top surface of the audio guiding device form an audio guiding channel; and
a casing, located above audio guiding device, wherein an inner surface of the casing and the top surface of the audio guiding device form an audio box.

7. The Audio lighting device according to the claim 6, wherein the audio lighting device comprises a plurality of audio outlets located outside the periphery of the bump structure and below the audio guiding channel.

8. The audio lighting device according to the claim 6, further comprising,
a reflector, fixed below the periphery of the light source board; and
a diffusion plate, located below the light source board.

9. An audio lighting device, comprising,
a wireless module, configured to receive a wireless signal and output an audio source control signal and a light source control signal;
a light source control circuit, configured to receive the light source control signal and output a light source driving current;
an audio source control circuit, configured to receive the audio source control signal and output an audio source driving signal;
a speaker, configured to output audio signal according to the audio source driving signal;
a recording terminal, configured to receive an environmental audio signal when the speaker does not output an audio signal;
an audio signal processing module, configured to generate a reverse audio according to the environmental audio signal, wherein the reverse audio automatically reduces noise when the recording terminal records audio; and a light source board, configured to receive the light source driving current to output light, wherein the audio lighting device further comprises, a heat dissipation device, wherein a center of the heat dissipation device has a bump structure raised upward;

an audio guiding device, having a top surface, a lateral surface and a bottom surface, wherein the bottom surface of the audio guiding device and the top surface of the audio guiding device form an audio guiding channel; and a casing, located above the audio guiding device, wherein the inner surface of the casing and the top surface of the audio guiding device form an audio box.

10. The audio lighting device according to the claim 9, wherein the audio lighting device comprises a plurality of audio outlets located outside the periphery of the bump structure and below the audio guiding channel.

11. The audio lighting device according to the claim 9, further comprising, a reflector, fixed below the periphery of the light source board; and a diffusion plate, located below the light source board.

* * * * *